United States Patent
La Torre et al.

(10) Patent No.: US 10,130,068 B2
(45) Date of Patent: *Nov. 20, 2018

(54) CARTRIDGE, AND A TEAT CUP

(71) Applicant: DELAVAL HOLDING AB, Tumba (SE)

(72) Inventors: Carlos La Torre, Tumba (SE); Anneli Lidmar, Tumba (SE)

(73) Assignee: DELAVAL HOLDING AB, Tumba (SE)

( * ) Notice: Subject to any disclaimer, the term of this patent is extended or adjusted under 35 U.S.C. 154(b) by 426 days.

This patent is subject to a terminal disclaimer.

(21) Appl. No.: 14/785,358

(22) PCT Filed: Apr. 29, 2014

(86) PCT No.: PCT/SE2014/050521
§ 371 (c)(1),
(2) Date: Oct. 19, 2015

(87) PCT Pub. No.: WO2014/178783
PCT Pub. Date: Nov. 6, 2014

(65) Prior Publication Data
US 2016/0066531 A1    Mar. 10, 2016

(30) Foreign Application Priority Data

May 2, 2013    (SE) ...................................... 1350536

(51) Int. Cl.
*A01J 5/16*    (2006.01)
*A01J 5/08*    (2006.01)

(52) U.S. Cl.
CPC .. *A01J 5/16* (2013.01); *A01J 5/08* (2013.01)

(58) Field of Classification Search
CPC ..................................... A01J 5/16; A01J 5/08
See application file for complete search history.

(56) References Cited

U.S. PATENT DOCUMENTS

| 1,159,103 | A | * | 11/1915 | Sabbo | ........................ A01J 5/16 |
| | | | | | 119/14.38 |
| 1,701,072 | A | | 2/1929 | Hapgood | |

(Continued)

FOREIGN PATENT DOCUMENTS

| DE | 472934 C | 3/1929 |
| EP | 0 511 723 A2 | 11/1992 |

(Continued)

OTHER PUBLICATIONS

International-Type Search Report, dated Nov. 5, 2013, from corresponding PCT application.

(Continued)

*Primary Examiner* — Joshua D Huson
(74) *Attorney, Agent, or Firm* — Young & Thompson

(57) ABSTRACT

A teatcup to be attached to a teat of an animal to be milked includes a connector and a cartridge received in the connector. The cartridge includes a sleeve having an upper end and a lower end, a teatcup liner mounted in the sleeve and having an inner space for receiving the teat, and a pulsation chamber provided between the sleeve and the teatcup liner. The teatcup liner includes an upper end portion located at the upper end of the sleeve, a barrel portion and a lower end portion extending beyond the lower end of the sleeve. The lower end portion forms an end nozzle extending beyond the lower end of the sleeve and having a circumferential external surface. An annular seal element is provided at the circumferential external surface to seal between the lower end nozzle and the connector.

18 Claims, 3 Drawing Sheets

(56) References Cited

U.S. PATENT DOCUMENTS

| | | | | |
|---|---|---|---|---|
| 1,995,283 | A * | 3/1935 | Schmitt | A01J 5/08 119/14.52 |
| 2,120,556 | A * | 6/1938 | Greene | A01J 5/08 119/14.49 |
| 2,502,956 | A | 4/1950 | Jansson | |
| 2,687,112 | A | 8/1954 | Shurts | |
| 4,352,234 | A * | 10/1982 | Noorlander | A01J 5/08 156/294 |
| 4,459,938 | A * | 7/1984 | Noorlander | A01J 5/08 119/14.49 |
| 4,459,939 | A | 7/1984 | Noorlander | |
| 4,964,368 | A | 10/1990 | Ball et al. | |
| 5,069,162 | A | 12/1991 | Thompson et al. | |
| 5,272,997 | A * | 12/1993 | van der Lely | A01J 5/007 119/14.08 |
| 6,308,656 | B1 * | 10/2001 | Milbrath | A01J 5/08 119/14.47 |
| 6,546,893 | B1 * | 4/2003 | Happel | A01J 5/08 119/14.47 |
| 7,350,478 | B2 * | 4/2008 | Fernandez | A01J 5/08 119/14.47 |
| 7,650,854 | B2 * | 1/2010 | Petterson | A01J 5/08 119/14.49 |
| 7,856,942 | B2 * | 12/2010 | Pettersson | A01J 5/08 119/14.47 |
| 7,963,249 | B2 * | 6/2011 | Duke | A01J 5/08 119/14.47 |
| 8,011,321 | B2 * | 9/2011 | Petterson | A01J 5/08 119/14.49 |
| 8,079,326 | B2 * | 12/2011 | Kassibrahim | A01J 5/08 119/14.49 |
| 9,339,004 | B2 * | 5/2016 | La Torre | A01J 5/044 |
| 9,635,829 | B2 * | 5/2017 | La Torre | A01J 5/044 |
| 9,775,324 | B2 * | 10/2017 | La Torre | A01J 5/044 |
| 2007/0245966 | A1 * | 10/2007 | Pettersson | A01J 5/08 119/14.47 |
| 2008/0202433 | A1 * | 8/2008 | Duke | A01J 5/08 119/14.49 |
| 2009/0050061 | A1 * | 2/2009 | Duke | A01J 5/08 119/14.02 |
| 2010/0326360 | A1 * | 12/2010 | Duke | A01J 5/08 119/14.02 |
| 2014/0345531 | A1 * | 11/2014 | La Torre | A01J 5/044 119/14.51 |
| 2014/0360431 | A1 * | 12/2014 | La Torre | A01J 5/044 119/14.51 |
| 2014/0360432 | A1 * | 12/2014 | La Torre | A01J 5/044 119/14.51 |
| 2016/0066531 | A1 * | 3/2016 | La Torre | A01J 5/16 119/14.43 |

FOREIGN PATENT DOCUMENTS

| | | | |
|---|---|---|---|
| GB | 419 956 | A | 11/1934 |
| GB | 2 078 077 | A | 1/1982 |
| GB | 2078077 | | 1/1982 |
| JP | S50149349 | | 12/1975 |
| JP | S5278347 | | 6/1977 |
| JP | S5712935 | | 1/1982 |
| JP | 10-174972 | | 6/1998 |
| JP | 2002-168382 | | 6/2002 |
| JP | 2008-502359 | | 1/2008 |
| RU | 2 180 167 | C2 | 3/2002 |
| RU | 2 263 445 | C1 | 11/2005 |
| SU | 1544301 | A1 | 2/1990 |
| WO | 93/13651 | A2 | 7/1993 |
| WO | 97/35469 | A1 | 10/1997 |
| WO | 01/45498 | A1 | 6/2001 |
| WO | 2005/120217 | A1 | 12/2005 |
| WO | WO 2005120216 | | 12/2005 |
| WO | 2013/095290 | A1 | 6/2013 |
| WO | WO-2013095288 A1 * | 6/2013 | ............ A01J 5/044 |
| WO | WO-2013095290 A1 * | 6/2013 | ............ A01J 5/044 |
| WO | WO-2013095291 A1 * | 6/2013 | ............ A01J 5/044 |
| WO | 2013/169186 | A1 | 11/2013 |

OTHER PUBLICATIONS

International Search Report, dated Sep. 12, 2014, from corresponding PCT application.

Supplementary International Search Report, dated Dec. 26, 2014, from corresponding PCT application.

Japanese Office Action dated Feb. 23, 2018 in corresponding Japanese Patent Application No. 2016-511706 with English translation of Japanese Office Action.

* cited by examiner

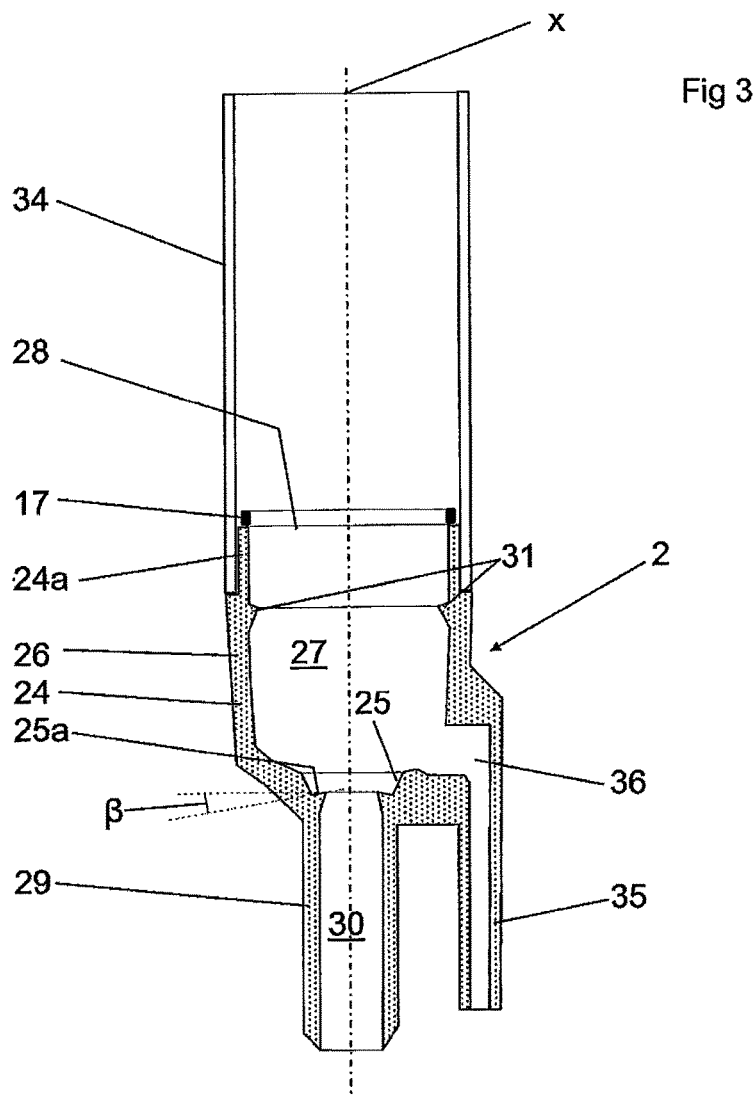
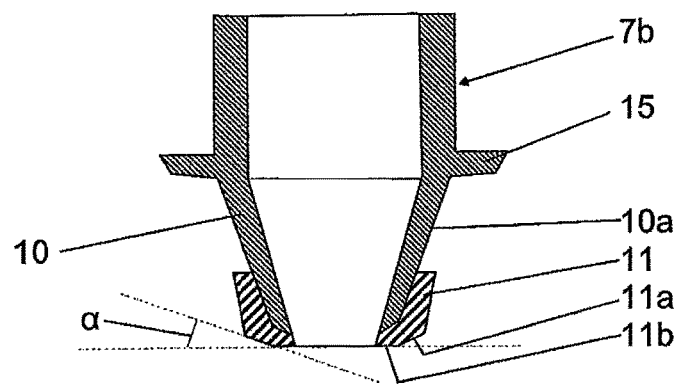

CARTRIDGE, AND A TEAT CUP

TECHNICAL FIELD OF THE INVENTION

The present invention refers generally to teatcups to be attached to the teats of animals to be milked. More precisely, the present invention refers to a connector configured to be received in a connector of a teatcup according to the preamble of claim 1, see U.S. Pat. No. 2,502,956. The present invention also refers to a teatcup to be attached to a teat of an animal to be milked.

BACKGROUND OF THE INVENTION AND PRIOR ART

Teatcups used today typically consists of two separate main parts, a shell and a teatcup liner mounted in the shell. A pulsation chamber is provided between the shell and the teatcup liner. The teatcup liner is an article of consumption that is subjected to wear, and thus has to be replaced on a regular basis. The replacement of the teatcup liner is a time-consuming and difficult work, requiring dismounting of the teatcup liner from the shell and mounting of a new teatcup liner in the shell.

Traditionally, the teatcup liner forms one single part together with a milk conduit, typically a so called short milk conduit. In order to enable replacement of only the barrel of the teatcup liner, it is know to produce teatcup liners being separate from the milk conduit. In such teatcups, the teatcup liner and a shell may form a cartridge to be connected to the milk conduit via an outlet nipple provided in a casing for receiving the cartridge, see for instance U.S. Pat. No. 2,502,956 or EP-511723.

In these prior art solutions, a difficulty exists with regard to the connection of the teatcup liner to the separate milk conduit. Especially, it is difficult to provide an easy mounting and dismounting of the cartridge to the casing and the milk conduit without leakage.

SUMMARY OF THE INVENTION

The object of the present invention is to overcome the problems discussed above and to provide a cartridge that enables a convenient and tight connection of a teatcup liner to a milk conduit. More specifically, it is an object of the present invention to provide a cartridge that permits easy dismounting and replacement of the teatcup liner and thus minimising of the time needed for the replacement without negatively influencing the hygienic properties of the teatcup.

This object is achieved by the casing defined above, which is characterised in that the lower end portion forms an end nozzle extending beyond the lower end of the sleeve and having a circumferential external surface, and that an annular seal element is provided at the circumferential external surface and configured to seal between the lower end nozzle and the connector.

Such a cartridge may be easily replaced and mounted in a connector connected to a milk conduit by introducing the end nozzle into the connector. The annular seal element may ensure a tight abutment of the end nozzle against the connector. Solely by pressing the end nozzle into the connector a secure and tight connection will be achieved. Consequently, the milk may flow in a reliable manner from the teatcup liner into the milk conduit connected to the connector.

According to an embodiment of the invention, the connector comprises an outlet nipple defining an outlet channel, wherein the annular seal element is configured to provide a tight transition for a milk channel for transport of milk from the inner space to the outlet channel.

According to a further embodiment of the invention, the connector comprises a connection space for receiving the cartridge, and a bottom wall, which delimits the connection space and through which the outlet channel extends, wherein the annular seal element is provided at the bottom wall to seal between the bottom wall and the end nozzle.

According to a further embodiment of the invention, the end nozzle has a tapering external shape. Advantageously, the end nozzle may have a tapering internal shape. Thanks to such an internal shape, a smooth and even milk flow from the teatcup liner into the milk conduit during milking may be ensured.

According to a further embodiment of the invention, the annular seal element is attached to the end nozzle by a permanent joint. Such a permanent joint may be formed by melting of at least one of the first material and the second material at the permanent joint. The melting, or welding, may secure a reliable and permanent joint between the lower end portion and the annular seal element. Advantageously, the annular seal element extends around the circumferential external surface. Furthermore, the annular seal element may be attached to the circumferential external surface.

According to a further embodiment of the invention, the annular seal element comprise a sloping zone sloping inwardly and downwardly towards the longitudinal centre axis x. For instance, the sloping zone may be conical. Advantageously, an inner zone having a smaller angle of inclination may be provided Inside the sloping zone.

According to a further embodiment of the invention, the annular seal element is made of a first material having a relatively high elasticity, and the lower end portion is made of a second material having a relatively low elasticity in comparison with the relatively high elasticity of the first material. Advantageously, the first material is different from the second material, or in other words may have a different composition than the second material. By making the lower end portion and thus the end nozzle in a less elastic material, i.e. a more rigid or stiff material, than the annular seal element, the end nozzle may be easily guided to a correct position in the connector. The barrel portion may be made of a third material having a relatively high elasticity in comparison with the relatively low elasticity of the second material. Advantageously, the barrel portion may be attached to the lower end portion by a permanent joint. Also this permanent joint may be formed by melting of at least one of the second material and the third material at the permanent joint.

According to a further embodiment of the invention, the lower end portion comprises a lower engagement member which engages the sleeve in such a manner that the barrel portion of the teatcup liner is maintained in a stretched state in the sleeve. In the stretched state, the teatcup liner is prolonged in comparison with a rest state in which it is not mounted in the shell and thus not subjected to any external forces.

According to a further embodiment of the invention, the lower engagement member comprises, or is formed by, a lower annular flange extending outwardly and abutting an end surface of the lower end of the sleeve. Preferably, the lower annular flange has a diameter that is greater the inner diameter of the lower end of the sleeve.

According to a further embodiment of the invention, the sleeve comprises a sealing ring extending around an outer surface of the sleeve, and a hole through the sleeve, which hole is configured to permit a pulsating vacuum to be applied in the pulsation chamber and which hole is provided between the sealing ring and the lower end of the sleeve.

According to a further embodiment of the invention, the cartridge comprises a lip member provided at the upper end portion of the teatcup liner and forming a lip defining an opening for the teat. Advantageously, the lip member may be detachably attached to the teatcup liner, or possibly to the sleeve, by a snap connection. Such a snap connection permits easy dismounting and replacement of the lip member.

The object is also achieved by the teatcup initially defined, comprising a connector and a cartridge as defined above to be received in the connector.

According to a further embodiment of the invention, the connector comprises a connection space for receiving the cartridge, and a bottom wall which delimits the connection space and through which the outlet channel extends, wherein the annular seal element is provided at the bottom wall to seal between the bottom wall and the end nozzle. Advantageously, the bottom wall may comprise a sloping area sloping outwardly and downwardly from the outlet channel, i.e. the bottom wall may have an outwardly sloping area which extends around the outlet channel and against which the annular seal element is pressed.

According to a further embodiment of the invention, the connector comprises a connection space for receiving the cartridge and a pulse nipple forming a pulse channel to the connection space and wherein the sleeve comprises a hole permitting communication between the connection space and the pulsation chamber.

BRIEF DESCRIPTION OF THE DRAWINGS

The present invention will now be explained more closely by means of a description of various embodiments and with reference to the drawings attached hereto.

FIG. 3 discloses a section of a connector of the teatcup in FIG. 1.

FIG. 4 discloses a section of a lower end portion of a teatcup liner of the cartridge.

DETAILED DESCRIPTION OF VARIOUS EMBODIMENTS OF THE INVENTION

Figure 1:
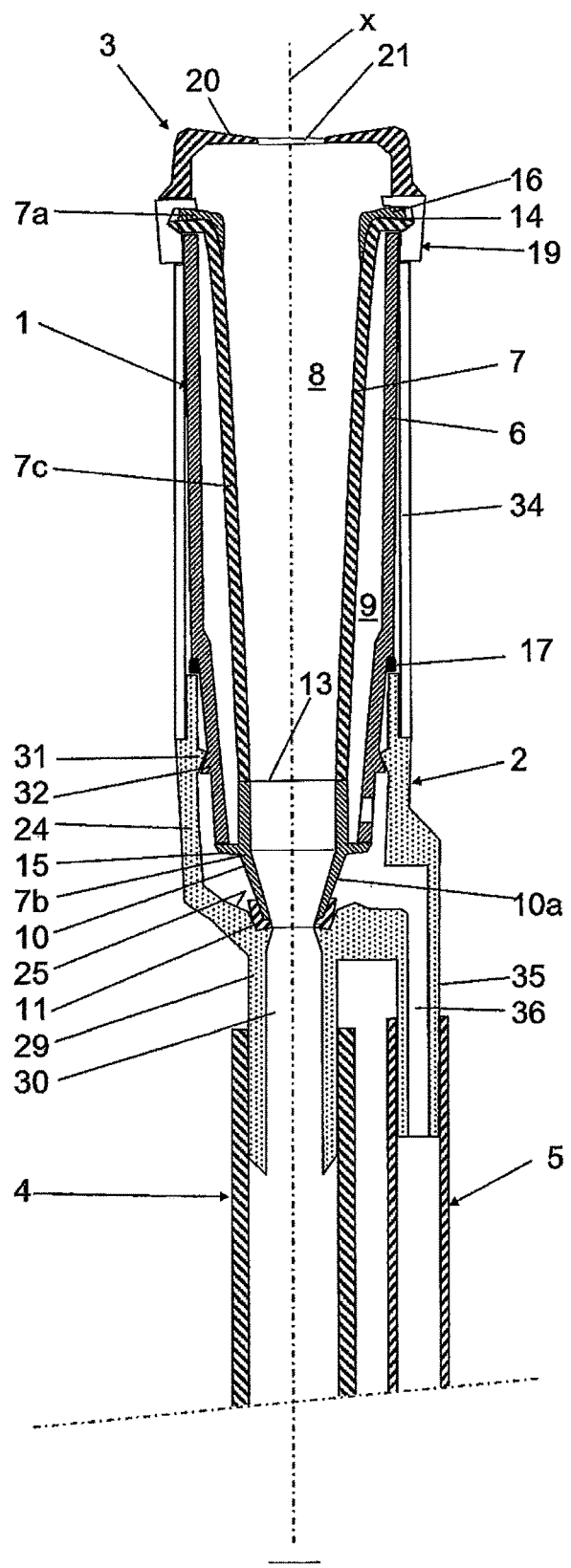
FIG. 1 discloses a longitudinal section of a teatcup connected to a milk conduit.

FIG. 1 discloses a teatcup to be attached to a teat of an animal to be milked. The teatcup comprises a cartridge 1 and a connector 2. The teatcup may also comprise a lip member 3. In addition, the teatcup may comprise or be connected to a milk conduit 4, such as a so called long milk conduit. Moreover, the teatcup may comprise or be connected to a pulse conduit 5, such as a so called long pulse conduit.

A longitudinal centre axis x extends through and along the teatcup, i.e. the cartridge 1, the connector 2 and the lip member 3. The longitudinal centre axis x also extends through and along an upper part of the milk conduit 4 when it is in a rest state as disclosed in FIG. 1.

Figure 2:
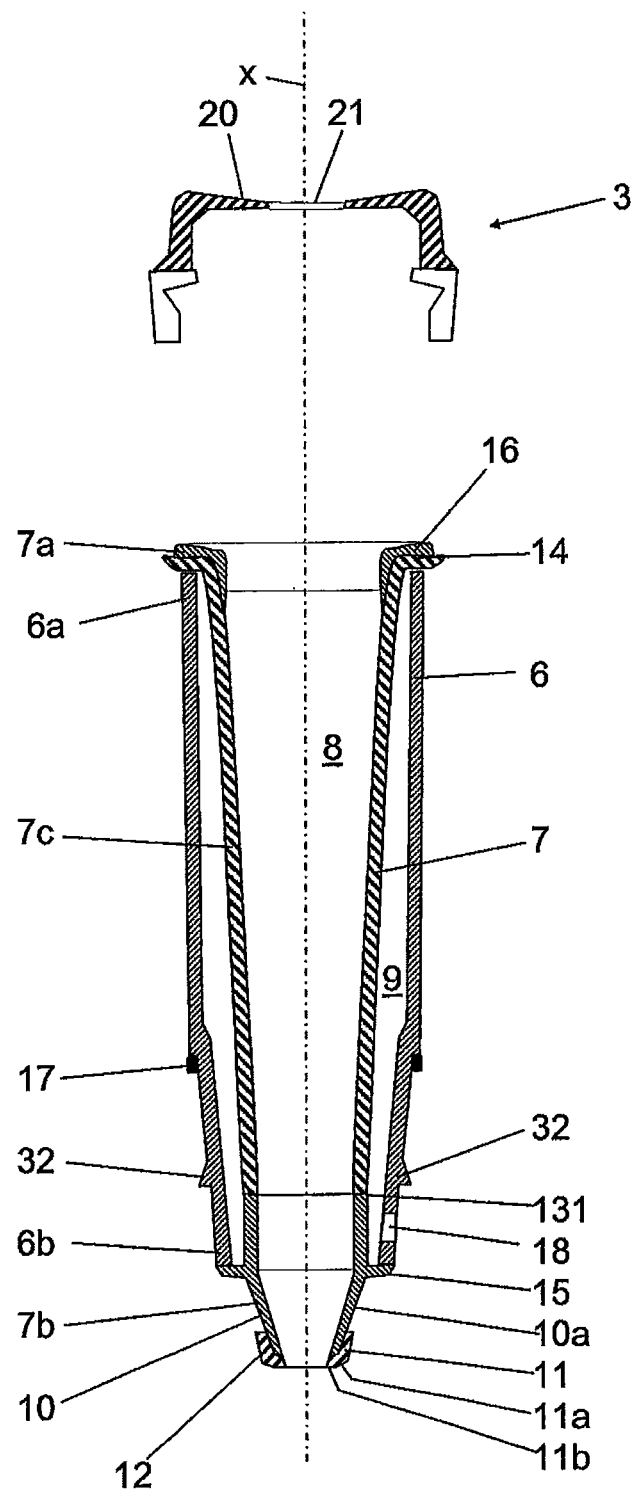
FIG. 2 discloses an exploded longitudinal section of a cartridge of the teatcup in FIG. 1.

The cartridge 1, see also FIG. 2, comprises a sleeve 6 having an upper end 6a and a lower end 6b, and a teatcup liner 7 mounted in the sleeve 6. In FIGS. 1 and 2, the cartridge is shown in a mounted state, i.e. the teatcup liner 7 is mounted in the sleeve 6. The teatcup liner 7 has or forms an inner space 8 for receiving the teat. A pulsation chamber 9 is provided or formed between an inner side of the sleeve 6 and an outer side of the teatcup liner 7.

The teatcup liner 7 comprises an upper end portion 7a located at the upper end 6a of the sleeve 6, a barrel portion 7c and a lower end portion 7b located at the lower end of the sleeve 6. The barrel portion 7c is an intermediate tubular portion provided between and adjoining the upper end portion 7a and the lower end portion 7b. The barrel portion 7c is the main part of the teatcup liner 7 and is in contact with the teat of the animal during milking.

The lower end portion 7b extends from a position within the sleeve 6 away from and beyond the lower end 6b of the sleeve 6. The lower end portion 7b forms an end nozzle 10, see also FIG. 4. The end nozzle 10 is the part of the lower end portion 7b that extends beyond the lower end 6b of the sleeve 6. The end nozzle 10 forms an outlet from the inner space 8. The end nozzle 10 has a circumferential external surface 10a. An annular seal element 11 is provided at and extends around the circumferential external surface 10a. The annular seal element 11 is configured to seal between the lower end nozzle 10 and the connector 2.

The end nozzle 10 has a tapering external shape, i.e. the circumferential external surface 10a is tapering towards the lower end. In particular, the circumferential external surface 10a is conical at least at a substantial part thereof.

The end nozzle 10 also has a tapering internal shape forming a tapering outlet for the milk from the inner space 8 of the teatcup liner 7.

In the embodiments disclosed, the annular seal element 11 is attached to the end nozzle 10 by a permanent joint 12, especially to the circumferential external surface 10a. Such a permanent joint 12 may be formed by a melt joint, a weld joint or a chemical bonding between the first material and the second material.

The annular seal element 11 is made of a first material, which is deformable and has a relatively high elasticity. The lower end portion 7b, i.e. the end nozzle 10, is made of a second material, which is different from the first material and has a different composition. The second material has a relatively low elasticity in comparison with the relatively high elasticity of the first material.

The annular seal element 11 comprises a sloping zone 11a sloping inwardly and downwardly towards the longitudinal centre axis x in a disconnected state, see FIGS. 2 and 4. The sloping zone 11a extends around the annular seal element 11. The sloping zone 11a may be conical. The inclination angle $\alpha$ of the sloping zone 11a may be 15-45°, preferably 20-40°, more preferably 25-35°, for instance 28°.

Inside the sloping zone 11a, an inner zone 11b having a smaller angle of inclination, for instance −5-+5°, especially 0°, i.e. a substantially flat inner zone 11b, may be provided.

The barrel portion 7c is made of a third material, which is different from the second material and has a different composition. The third material has a relatively high elasticity in comparison with the relatively low elasticity of the second material. The barrel portion 7c is attached to the lower end portion 7b by a permanent joint.

The first material may consist of or comprise rubber, black rubber, silicone rubber, elastic polymers, such as Thermoplastic Elastomers, TPE, or any other suitable elastic material.

The second material may consist of or comprise a suitable polymer with low elasticity, such as polyeten, polypropene, etc.

The third material may consist of or comprise rubber, black rubber, silicone rubber, elastic polymers, such as Thermoplastic Elastomers, TPE, or any other suitable elastic material.

The upper end portion 7a is made of a fourth material having a relatively low elasticity in comparison with the relatively high elasticity of the third material of the barrel portion 7c. The fourth material may be a material having similar or the same composition and/or properties as the second material of the lower end portion 7b.

The barrel portion 7c is attached to the lower end portion 7b by a lower permanent joint 13. Such a permanent joint 13 may be formed by a melt joint, a weld joint or a chemical bonding between the second material and the third material.

The barrel portion 7c is also attached to the upper end portion 7a by an upper permanent joint 14. Such a permanent joint 14 may be formed by a melt joint, a weld joint or a chemical bonding between the third material and the fourth material.

The lower and/or upper permanent joints 13, 14 my be formed by melting of at least one of the materials at the permanent joint. The lower and/or upper permanent joints 13, 14 may also be obtained through vulcanisation.

Alternatively, the barrel portion 7c and the lower end portion 7b and/or the upper end portion 7a are made of the same material, for instance in one single piece, preferably through injection moulding.

The sleeve 6 is made of a fifth material having a relatively low elasticity. The fifth material may be a material having similar or the same composition and/or properties as the second material.

The lower end portion 7b of the teatcup liner 7 comprises a lower engagement member 15, which engages the sleeve 6 in such a manner that the barrel portion 7c of the teatcup liner 7 is maintained in a stretched state in the sleeve 6. The lower engagement member 15 comprises, or is formed as, an annular flange extending outwardly at least beyond an inner diameter of an end surface of the lower end 6b of the sleeve 6. The annular flange of the lower end portion 7b may extend radially or substantially radially outwardly with respect to the longitudinal centre axis x. The annular flange of the lower end portion 7b extends beyond and abuts the end surface of the lower end 6b of the sleeve 6.

The upper end portion 7a of the teatcup liner 7 comprises an upper engagement member 16, which engages the sleeve 6 at the upper end 6a of the sleeve 6. The upper engagement member 16 comprises, or is formed as, an upper annular flange extending outwardly at least beyond an inner diameter of an end surface of the upper end 6a of the sleeve 6. The annular flange of the upper engagement member 16 may extend radially or substantially radially outwardly with respect to the longitudinal centre axis x. In the embodiment disclosed, the annular flange of the upper engagement member 16 of the upper end portion 7a abuts an outwardly bent part of the first material of the barrel portion 7c, which in turn abuts the end surface of the upper end 6a of the sleeve 6.

The sleeve 6 comprises a sealing ring 17 extending around an outer surface of the sleeve 6. The sealing ring 17 is configured to engage a surface, especially an end surface, of the connector 2, as will be described below.

Moreover, the sleeve 6 comprises a hole 18 through the sleeve 6, or more precisely through the wall of the sleeve 6. The hole 18 permits a pulsating vacuum to be applied in the pulsation chamber 9. The hole 18 is provided between the sealing ring 17 and the lower end 6b of the sleeve 6.

The lip member 3 is in the embodiment disclosed attached to the upper end portion 7a of the teatcup liner 7, as can be seen in FIGS. 1 and 2. The lip member 3 is preferably detachably attached to the cartridge 1 by a snap connection 19. In FIG. 2 the lip member 3 is shown in a detached state with respect to the teatcup liner 7 and the cartridge 1. Alternatively, the lip member 3 may be detachably attached to the sleeve 6.

The lip member 3 comprises or forms a lip 20, which surrounds and defines an opening 21 for the teat to the inner space 8. The lip 20 is also made of a relatively elastic material, possibly a material having similar or the same composition and/or properties as the third material of the barrel portion 7c.

It is to be noted that the lip member or the lip 20 as an alternative may form an integrated part of the teatcup liner 7, preferably by being permanently joined to the upper end portion 7a, or being manufactured in one single piece with the teatcup liner 7.

The connector 2, see also FIG. 3, comprises a casing 24, which has a bottom wall 25 and a surrounding wall 26 having an inner surface. The connector 2, or casing 24, defines a connection space 27, which is also delimited by the bottom wall 25.

The connector 2, or the casing 24, comprises an inlet opening 28 for the cartridge 1 to the connection space 27. The cartridge 1 may be introduced into the connection space 27 through the inlet opening 28.

Furthermore, the connector comprises an outlet nipple 29 defining an outlet channel 30 for the milk. The outlet channel 30 extends through the bottom wall 25. The outlet nipple 29 is configured to be connected to the milk conduit 4 by being introduced into the milk conduit 4.

In the embodiment disclosed, the longitudinal centre axis x extends concentrically through the casing 24 and through the inlet opening 28 and the outlet nipple 29. The bottom wall 25 has a sloping area 25a adjoining the outlet channel 30 and sloping outwardly from the outlet channel 30. The inclination angle β of the sloping area 25a may be 5-20°, preferably 10-15°, for instance 12°. Outside the outwardly downwardly sloping area 25a, the bottom wall 25 may slope outwardly and slightly upwardly. The annular seal element 11 is provided at or adjoins the bottom wall 25 to seal between the bottom wall 25 and the end nozzle 10, when the cartridge 1 is introduced into the connection space 27. The bottom wall 25 thus has an outwardly sloping area 25a against which the inner zone 11b and the sloping zone 11a of the annular seal element 11 is pressed.

The connector 2 is connected to the cartridge 1 by means of locking means. The locking means is provided on the inner surface of the surrounding wall 26. Corresponding locking means is provided on the outer side of the sleeve 6. The corresponding locking means is provided between the sealing ring 17 and the lower end 6b of the sleeve 6. The locking means may comprise on or more outer bayonet coupling parts 31 on the inner surface of the casing 24. The corresponding locking means may comprise one or more inner bayonet coupling parts 32 on the outer surface of the sleeve 6 of the cartridge 1. The outer bayonet coupling parts 31 and the inner bayonet coupling parts 32 form a bayonet coupling permitting secure locking of the cartridge 1 in the connector 2, whereby the end nozzle 10 and the annular seal element 11 is pressed to abutment, or tight abutment, against the bottom wall 25, so that the annular seal element 11 is elastically deformed.

Furthermore, the connector 2 comprises an outer shell 34 extending beyond the inlet opening 28 of the casing 24. The outer shell 34 is tubular and attached to an end portion 24a of the casing 24. The purpose of the outer shell 34 is to protect the cartridge 1. The outer shell 34 may be made of a relatively rigid material, for instance as plastics or metal, such as stainless steel.

The connector 2 comprises a pulse nipple 35 forming a pulse channel 36 to the connection space 27. The pulse nipple 35 is configured to be connected to the pulse conduit 5 by being introduced into the pulse conduit 5. The pulse conduit 5 thus communicates with the pulsation camber 9 via pulse channel 36, the connection space 27 and the hole 18 through the sleeve 6.

The assembling of the teatcup is now to be described. One assembling step is to produce the cartridge 1, wherein the teatcup liner 7 is mounted in the sleeve 6. This mounting may be made in advance. The teatcup liner 7 is then pulled through the sleeve 6, wherein the lower end portion 7b is introduced at the upper end 6a of the sleeve and pushed and pulled downwardly so that the lower end portion 7b passes the lower end 613 until the lower engagement member 15 snaps outwardly to abutment against the end surface of the lower end 6 of the sleeve 6. Thanks to the upper engagement member 16, the upper end portion 7a will not pass through the upper end 6a of the sleeve 6, but the lower and upper engagement members 15 and 16 secure that the teatcup liner 7 and its barrel portion 7c is retained in a stretched state in the sleeve 6. In the stretched state, the teatcup liner 7 is prolonged in comparison with a rest state, in which the teatcup liner 7 is not subjected to any external forces, i.e. before the teatcup liner 7 is mounted in the shell 6.

Thereafter the lip member 3 may be attached to the cartridge 1, wherein the lip member 3 is pressed onto the upper end 6a of the sleeve 6 so that the snap connection 19 locks the lip member 3 in a detachable manner on the cartridge 1.

The cartridge 1 is a replaceable component, together with or without the lip member 3, depending on the wear of the lip 21. The cartridge 1 and the lip member 3 are the components of the teatcup that are subjected to significant wear.

A further assembling step is the assembling of the connector 1. The outer shell 34 may be mounted to the casing 24 in advance or after mounting of the milk conduit 4 and the pulse conduit 5. The milk conduit 4 is mounted to the connector 2 by the introduction of the outlet nipple 29 into the milk conduit 4.

In a similar manner, the pulse conduit 5 is mounted to the connector 2 by the introduction of the pulse nipple 35 into the pulse conduit 5.

The teatcup is then present as two main components, in the disconnected state, namely the cartridge 1 together with the lip member 3, and the connector 2 together with the milk conduit 4 and the pulse conduit 5. The milk conduit 4 and the pulse conduit 5 may be mounted to their respective components of the remaining milking equipment in any suitable manner.

Finally, these two main components are connected to each other. The cartridge 1, with or without the lip member 3, is then introduced into the connection space 27 of the connector 2 until the annular seal element 11 abuts tightly the bottom wall 25, as explained above, in a connected state, wherein the annular seal element 11 is elastically deformed.

In this position of the cartridge 1 vis-à-vis the connector 2, the end surface of the casing 24 will abut the sealing ring 17 so that the space formed between the sleeve 6 and the casing 24 is tightly sealed, thereby permitting proper communication of the pulsating vacuum. It is to be noted that the sealing ring 17 alternatively may be provided on the connector 2, especially on the casing 24 as indicated in FIG. 3.

When the cartridge 1 has reach this position vis-à-vis the milk conduit, the cartridge is locked in the connector 2, by means of the bayonet coupling, i.e. the coupling of the outer bayonet coupling part 31 and the inner bayonet coupling part 32. This coupling may be achieved through a turning of the cartridge 1 in relation to the connector 2. It is to be noted that the coupling and locking of the cartridge 1 to the connector 2 may also be achieved by other locking means, e.g. a thread connection.

The present invention is not limited to the embodiments disclosed but may be varied and modified within the scope of the following claims.

The terms "upper" and "lower" used in the description and the claims refer to the orientation disclosed in the figures and the approximate orientation when the teatcup is attached to the teat of an animal.

The annular seal element 11 may alternatively be attached to the bottom wall 25 or even be a separate element attached between the end nozzle 10 and the bottom wall 25 by being clamped therebetween.

LIST OF REFERENCE SIGNS 1 cartridge
2 connector
3 lip member
4 milk conduit
4a first end portion
4b second end portion
4c conduit portion
5 pulse conduit
5a attachment end portion
6 sleeve
6a upper end
6b lower end
7 teatcup liner
7a upper end portion
7b lower end portion
7c barrel portion
8 inner space
9 pulsation chamber
10 end nozzle
10a circumferential external surface
11 annular seal element
11a sloping zone
11b inner zone
12 permanent joint
13 lower permanent joint
14 upper permanent joint
15 lower engagement member
16 upper engagement member
17 sealing ring
18 hole
19 snap connection
20 lip
21 opening
24 casing
24a end portion
25 bottom wall
25a sloping area
26 surrounding wall
27 connection space
28 inlet opening
29 outlet nipple
30 outlet channel 31 outer bayonet coupling part
32 inner bayonet coupling part
34 outer shell
35 pulse nipple
36 pulse channel

The invention claimed is:

1. A combination of a cartridge and a connector of a teatcup to be attached to a teat of an animal to be milked, wherein the cartridge is configured to be received in the connector (2), the cartridge (1) comprising
   a sleeve (6) having an upper end (6a) and a lower end (6b);
   a teatcup liner (7) mounted in the sleeve (6) and having an inner space (8) for receiving said teat;
   a pulsation chamber (9) provided between an inner side of the sleeve (6) and an outer side of the teatcup liner (7), wherein the teatcup liner (7) comprises
      an upper end portion (7a) located at the upper end (6a) of the sleeve (6),
      a barrel portion (7c), and
      a lower end portion (7b) extending beyond the lower end (6b) of the sleeve (6), wherein that the lower end portion (7b) is comprised of an end nozzle (10) extending beyond the lower end (6b) of the sleeve (6), the end nozzle (10) having a circumferential external surface (10a) extending to a lowermost end of the end nozzle (10); and
   an annular seal element (11) having
      i) an circumferential internal surface attached to at least a portion of the circumferential external surface (10a) of the end nozzle (10) including at the lowermost end surface of the end nozzle (10), and
      ii) a circumferential external surface that includes a lowermost inner zone (11b) that covers the lowermost end surface of the end nozzle (10), wherein when the sleeve and liner are installed in the connector with the lowermost inner zone (11b) of the circumferential external surface of the annular seal element (11) pressing in abutment against the connector, the annular seal element (11) provides a seal between the end nozzle (10) and the connector (2), wherein,
   with the cartridge (1) received in the connector (2), a longitudinal center axis (x) extends through and along the cartridge (1) and the connector (2), the connector (2) comprises
      i) a casing wall (24) extending along the longitudinal center axis (x),
      ii) a bottom wall (25) connecting to the casing wall (24) and also extending along the longitudinal center axis (x), wherein, with the cartridge (1) received in the connector (2), the bottom wall (25) is sealed against the circumferential external surface of the annular seal element (11), and
      iii) a wall portion (25a) joining the bottom wall (25) and extending radially outwardly with respect to the longitudinal center axis (x), and that, with the cartridge (1) received in the connector (2), is sealed against the lowermost inner zone (11b) of the circumferential external surface of the seal pressing in abutment against the wall portion (25a) of the connector (2),
   the connector (2) comprises an outlet nipple (29) extending below the bottom wall (25) and the wall portion (25a) along the longitudinal center axis (x), and defining an outlet channel (30), and with the cartridge (1) received in the connector ($^2$), the annular seal element (11) provides a tight transition for a milk channel for transport of milk from the inner space (8) to the outlet channel (30).

2. The combination according to claim 1, wherein, with the cartridge (1) received in the connector (2), the connector (2) comprises a connection space (27) between i) an outside surface of the lower end (6b) of the sleeve, the circumferential external surface (10a) of the end nozzle (10), and the circumferential external surface of the annular seal element (11) and ii) casing wall (24) connected to the bottom wall (25) which delimits the connection space (27) and through which the outlet channel (30) extends.

3. The combination according to claim 2, the end nozzle (10) has a tapering external shape.

4. The combination according to claim 1, wherein the annular seal element (11) is attached to the end nozzle (10) by a permanent joint (12).

5. The combination according to claim 1, wherein the circumferential external surface of the annular seal element (11) comprises a sloping zone (11a) sloping inwardly and downwardly with an inclination angle ($\alpha$) with respect to a line drawn orthogonal to the longitudinal center axis (x).

6. The combination according to claim 1, wherein the annular seal element (11) is made of a first material having a first elasticity, and the lower end portion (7b) is made of a second material having a second elasticity that is relatively low in comparison with the first elasticity of the first material.

7. The combination according to claim 6, wherein the barrel portion (7c) is made of a third material having a third elasticity that is relatively high in comparison with the second elasticity of the second material.

8. The combination according to claim 1, wherein the lower end portion (7b) comprises a lower engagement member (15) which engages the sleeve (6) in such a manner that the barrel portion (7c) of the teatcup liner (7) is maintained in a stretched state in the sleeve (6).

9. The combination according to claim 8, wherein the lower engagement member (15) comprises an annular flange extending radially outwardly with respect to the longitudinal center axis (x) and abutting an end surface of the lower end (6b) of the sleeve (6).

10. The combination according to claim 1, wherein the sleeve further comprises
   a sealing ring (17) extending around an outer surface of the sleeve (6), and
   a hole (18) through the sleeve (6), which hole (18) is configured to permit a pulsating vacuum to be applied in the pulsation chamber (9) and which is provided between the sealing ring (17) and the lower end (6b) of the sleeve (6).

11. The combination of claim 1, wherein the circumferential external surface of the end nozzle (10) has a tapering external shape and the circumferential external surface of the seal element (11) has a tapering external shape.

12. The combination according to claim 1, wherein the wall portion (25a) joining the bottom wall (25) and extending radially outwardly with respect to the longitudinal center axis (x) slopes upwardly towards the longitudinal center axis (x).

13. A combination of a cartridge, a teatcup to be attached to a teat of an animal to be milked, and a connector (2) of the teatcup,
   wherein the cartridge is configured to be received in the connector (2), the cartridge (1) comprising a sleeve (6) having an upper end (6a) and a lower end (6b);

a teatcup liner (7) mounted in the sleeve (6) and having an inner space (8) for receiving said teat;

a pulsation chamber (9) provided between an inner side of the sleeve (6) and an outer side of the teatcup liner (7), wherein the teatcup liner (7) comprises an upper end portion (7a) located at the upper end (6a) of the sleeve (6), a barrel portion (7c), and a lower end portion (7b) extending beyond the lower end (6b) of the sleeve (6), wherein that the lower end portion (7b) is comprised of an end nozzle (10) extending beyond the lower end (6b) of the sleeve (6), the end nozzle (10) having a circumferential external surface (10a) extending to a lowermost end of the end nozzle (10); and an annular seal element (11) having i) an circumferential internal surface attached to at least a portion of the circumferential external surface (10a) of the end nozzle (10) including at the lowermost end surface of the end nozzle (10), and ii) a circumferential external surface that includes a lowermost inner zone (11b) that covers the lowermost end surface of the end nozzle (10), wherein when the sleeve and liner are installed in the connector with the lowermost inner zone (11b) of the circumferential external surface of the annular seal element (11) pressing in abutment against the connector, the annular seal element (11) provides a seal between the end nozzle (10) and the connector (2), wherein the circumferential external surface of the end nozzle (10) has a tapering external shape and the circumferential external surface of the seal element (11) has a tapering external shape, wherein, with the cartridge (1) received in the connector (2), a longitudinal center axis (x) extends through and along the cartridge (1) and the connector (2), and the connector (2) defines a connection space (27) receiving the cartridge, and a bottom wall (25) which delimits the connection space (27) and through which an outlet channel (30) extends, and wherein the annular seal element (11) is pressed at the bottom wall (25) to seal between the bottom wall (25) and the end nozzle (10), and wherein the bottom wall (25) comprises a sloping area (25a) sloping outwardly and downwardly from the outlet channel (30).

14. The combination according to claim 13, wherein the connector (2) further comprises a pulse nipple (35) forming a pulse channel (36) to the connection space (27) and wherein the sleeve (6) comprises a hole (18) permitting communication between the connection space (27) and the pulsation chamber (9).

15. The combination according to claim 13, wherein the annular seal element (11) is attached to the end nozzle (10) by a permanent joint (12).

16. The combination according to claim 13, wherein the annular seal element (11) is made of a first material having a first elasticity, and the lower end portion (7b) is made of a second material having a second elasticity that is relatively low in comparison with the first elasticity of the first material.

17. The combination according to claim 16, wherein the barrel portion (7c) is made of a third material having a third elasticity that is relatively high in comparison with the second elasticity of the second material.

18. The combination according to claim 13, wherein the circumferential external surface of the end nozzle (10) has a tapering external shape and the circumferential external surface of the seal element (11) has a tapering external shape.

* * * * *